United States Patent [19]

Raikes et al.

[11] Patent Number: 5,009,276

[45] Date of Patent: Apr. 23, 1991

[54] ELECTRONIC POSTAL SCALE WITH MULTILINGUAL OPERATOR PROMPTS AND REPORT HEADINGS

[75] Inventors: Terry E. Raikes, Santa Rosa; William L. Kramer, Windsor; John B. Howard, Forestville, all of Calif.; Wayne D. Moore, North York, Canada; Louis Jackson, Milford, Conn.; Jeffrey D. Kotecki, Newtown, Conn.

[73] Assignee: Pitney Bowes Inc., Stamford, Conn.

[21] Appl. No.: 466,120

[22] Filed: Jan. 16, 1990

[51] Int. Cl.[5] ........................ G01G 19/40; G06F 15/20

[52] U.S. Cl. ............................. 177/25.15; 364/464.02

[58] Field of Search ..................................... 177/25.15; 364/200 MS File, 464.02

[56] References Cited

U.S. PATENT DOCUMENTS

| | | | |
|---|---|---|---|
| 4,180,854 | 12/1979 | Walden et al. | 364/200 |
| 4,475,806 | 10/1984 | Daughton et al. | 355/14 R |
| 4,566,078 | 1/1986 | Crabtree | 364/900 |
| 4,584,648 | 4/1986 | Dlugos | 364/464 |
| 4,595,980 | 6/1986 | Innes | 364/200 |
| 4,615,002 | 9/1986 | Innes | 364/200 |

FOREIGN PATENT DOCUMENTS

| | | | |
|---|---|---|---|
| 273417 | of 1987 | Japan | 23/42 |

*Primary Examiner*—George H. Miller, Jr.

*Attorney, Agent, or Firm*—Nathaniel Levin; Melvin J. Scolnick; David E. Pitchenik

[57] ABSTRACT

An electronic postal scale displays operator prompt messages and generates reports in more than one language. The language to be used in selectable by the operator of the scale. In a preferred embodiment there are two languages, English and French.

16 Claims, 9 Drawing Sheets

DIR 2
123 ANY STREET
TORONTO ONTARIO
M2N1A1

FIG. 8A

200A

TRANSACTION REPORT

DATE 25/05/89

210A

220A

| | PACKAGE ID | CLASS | P.CODE/ ZONE | PCS | KG/ LBS.OZ‡ | CHARGES | COD | DV | ADD | DS | TAG | H/C | OTHER FEES | CUSTOM | CUSTOM2 | TOTAL CHRG |
|---|---|---|---|---|---|---|---|---|---|---|---|---|---|---|---|---|
| | 0 | LEVL1 | S/4 | | 0 230 | 11.00 | | | | | | | | | | 11.00 |
| | 1 | U-DAR | /22 | | 0 230 | 11.30 | | | | | | | | | | 11.30 |
| | 2 | LEVL1 | S/4 | | 0 230 | 11.00 | | | | | | | | | | 11.00 |
| | 3 | LEVL1 | S/4 | | 0 230 | 11.00 | | | | | | | | | | 11.00 |
| | 4 | LEVL1 | S/4 | | 0 230 | 11.00 | | | | | | | | | | 11.00 |
| | 5 | LEVL1 | S/4 | | 0 230 | 11.00 | | | | | | | | | | 11.00 |
| | 6 | LEVL1 | S/4 | | 0 230 | 11.00 | | | | | | | | | | 11.00 |
| | 7 | LEVL1 | S/4 | | 0 230 | 11.00 | | | | | | | | | | 11.00 |
| | 8 | LEVL1 | S/4 | | 0 230 | 11.00 | | | | | | | | | | 11.00 |
| | 9 | LEVL1 | S/4 | | 0 230 | 11.00 | | | | | | | | | | 11.00 |
| | 25 | SWOG PARENT PKG - CARRIER: CANPAR - 2661 ID# | | | | | | | | | 00010 | | | | | |
| | 69 | SWOG PARENT PKG - CARRIER: CANADA PST-MET - OSLTR ID# | | | | | | | | | 00015 | | | | | |
| | L5 | SWOG PARENT PKG - CARRIER: CANPAR - 2661 ID# | | | | | | | | | 00010 | | | | | |
| | 100 | SWOG PARENT PKG - CARRIER: CANADA PST-MET - OSLTR ID# | | | | | | | | | 00015 | | | | | |
| | 200 | SWOG PARENT PKG - CARRIER: CANADA PST-MET - OSLTR ID# | | | | | | | | | 00015 | | | | | |
| | 300 | SWOG PARENT PKG - CARRIER: CANADA PST-MET - OSLTR ID# | | | | | | | | | 00015 | | | | | |
| | 585 | SWOG PARENT PKG - CARRIER: CANPAR - 2661 ID# | | | | | | | | | 00010 | | | | | |
| | 675 | SWOG PARENT PKG - CARRIER: CANPAR - 2661 ID# | | | | | | | | | 00010 | | | | | |
| V | 00001 | U-DSF | S/5 | | 0 230- | 2.30- | | | | | | | | | | 2.30- |
| | 00002 | U-DAR | /22 | | 0 230 | 11.30 | | | | | | | | | | 11.30 |
| | 00003 | U-DAR | /24 | | 0 230 | 14.00 | | | | | | | | | | 14.00 |
| | 00004 | C-USA | /2 | | 0 08.0‡ | 4.60 | | | | | | | | | | 4.60 |
| | 00005 | LEVL1 | S/4 | | 0 230 | 11.00 | | | | | | | | | | 11.00 |
| V | 00006 | CLTAG | S/5 | | 0 230- | 2.30- | | | | | | ‡ | | | | 2.30- |
| | 00007 | GENRL | S25/6 | | 0 230 | 4.45 | | | | | | | | | | 4.45 |
| | 00008 | LEVL4 | S/4 | | 1 230 | 11.20 | | | | | | | | | | 11.20 |
| | 00009 | U-DAL | /22 | | 0 230 | 8.50 | | | | | | | | | | 8.50 |
| | 00010 | 2661 | J/3 | | 0 230 | 1.84 | | | | | | | | | | 1.84 |
| V | 00011 | DOMES | /7 | | 0 230- | 12.90- | | | | | | | | | | 12.90- |
| | 00012 | DOMES | /7 | | 0 230 | 12.90 | | | | | | | | | | 12.90 |
| | 00013 | DOMES | /7 | | 0 230 | 12.90 | | | | | | | | | | 12.90 |
| | 00014 | U-DAR | /22 | | 0 230 | 21.20 | 526.05 | 600.00 | ‡ | ‡ | | ‡ | 4.85 | 12345678901 | 98765432109 | 26.05 |
| | 00015 | DSLTR | / | | 0 230 | 1.52 | 350.00 | 500.00 | | | | ‡ | 10.46 | 12345678901 | 98765432109 | 11.98 |
| | 00016 | DSLTR | / | | 0 230 | 1.52 | | 1000.00 | | | | | 4.50 | 12345678901 | 98765432109 | 6.02 |
| | 00017 | LEVL1 | S/4 | | 0 230 | 11.00 | | 450.00 | | | | | | 12345678901 | 98765432109 | 11.00 |
| | 00018 | GENRL | S1J/6 | | 0 230 | 4.45 | 313.90 | 690.00 | ‡ | | | | 9.45 | 12345678901 | 98765432109 | 13.90 |
| | KL7IS | SWOG PARENT PKG - CARRIER: CANPAR - 2661 ID# | | | | | | | | | 00010 | | | | | |
| | 354180 | SWOG PARENT PKG - CARRIER: CANPAR - 2661 ID# | | | | | | | | | 00010 | | | | | |

SUMMARY

190A

| | COUNT | CLASS | KG/LBS.OZ‡ | CHARGES |
|---|---|---|---|---|
| CANADA PST-MET | | | | |
| | 2 | OSLTR | 0 460 | 3.04 |
| CANPAR | | | | |
| | 2 | GENRL | 0 460 | 8.90 |
| | 1 | 2661 | 0 230 | 1.84 |
| | 1 | C-USA | 0 8.0 ‡ | 4.60 |
| UPS | | | | |
| | 4 | U-DAR | 0 920 | 57.80 |

PAGE 2

DIR 2
123 ANY STREET
TORONTO ONTARIO
M2N1A1

DATE 25/05/89

TRANSACTION REPORT

| | COUNT | CLASS | KG/LBS.OZ‡ | CHARGES |
|---|---|---|---|---|
| | 1 | U-DAL | 0 230 | 8.50 |
| PRIORITY POST | | | | |
| | 11 | LEVL1 | 2 530 | 121.00 |
| | 1 | LEVL4 | 1 230 | 11.20 |
| | 2 | DOMES | 0 460 | 25.80 |

| | | WEIGHT | CHARGES | COD CHRG | DV CHRG | ADD CHRG | DS | TAG | HDLG CHRG | SPECIAL FES |
|---|---|---|---|---|---|---|---|---|---|---|
| KG | 24 | 6 520 | 238.08 | | | | | | | |
| LBS.OZ‡ | 1 | 0 8.0‡ | 4.60 | | | | | | | |
| TOTAL COUNT | 25 | | | 3 | 5 | 2 | 1 | 0 | 2 | 1 |
| TOTAL $ | | | 242.68 | 11.00 | 13.53 | .90 | | | 2.00 | 1.83 |

GRAND TOTAL $271.94

FIG. 8B

DIR 2
123 ANY STREET
TORONTO ONTARIO
M2N1A1

200B → ETAT DES TRANSACTIONS

DATE 25/05/89

210B

| | ID PAQUET | CLASSE | CODE P/ ZONE | OBJ | KG/ LBS.OZ‡ | FRAIS | CR | VD | ADL | SO | BON | F/K | AUTRES FRAIS | PERSON | PERSON2 | FRAIS TOTAUX |
|---|---|---|---|---|---|---|---|---|---|---|---|---|---|---|---|---|
| | 0 | NIV 1 | S/4 | | 0 230 | 11.00 | | | | | | | | | | 11.00 |
| | 1 | U-IAR | /22 | | 0 230 | 11.30 | | | | | | | | | | 11.30 |
| | 2 | NIV 1 | S/4 | | 0 230 | 11.00 | | | | | | | | | | 11.00 |
| | 3 | NIV 1 | S/4 | | 0 230 | 11.00 | | | | | | | | | | 11.00 |
| | 4 | NIV 1 | S/4 | | 0 230 | 11.00 | | | | | | | | | | 11.00 |
| | 5 | NIV 1 | S/4 | | 0 230 | 11.00 | | | | | | | | | | 11.00 |
| | 6 | NIV 1 | S/4 | | 0 230 | 11.00 | | | | | | | | | | 11.00 |
| | 7 | NIV 1 | S/4 | | 0 230 | 11.00 | | | | | | | | | | 11.00 |
| | 8 | NIV 1 | S/4 | | 0 230 | 11.00 | | | | | | | | | | 11.00 |
| | 9 | NIV 1 | S/4 | | 0 230 | 11.00 | | | | | | | | | | 11.00 |
| | 25 | EAAA | PAQ PARENT - TRANSP : CANPAR - 2661 ID# | | | | | | | | 00010 | | | | | |
| | 69 | EAAA | PAQ PARENT - TRANSP : POST CAN-COMPT - LTRSD ID# | | | | | | | | 00015 | | | | | |
| | L5 | EAAA | PAQ PARENT - TRANSP : CANPAR - 2661 ID# | | | | | | | | 00010 | | | | | |
| | 100 | EAAA | PAQ PARENT - TRANSP : POST CAN-COMPT - LTRSD ID# | | | | | | | | 00015 | | | | | |
| | 200 | EAAA | PAQ PARENT - TRANSP : POST CAN-COMPT - LTRSD ID# | | | | | | | | 00015 | | | | | |
| | 300 | EAAA | PAQ PARENT - TRANSP : POST CAN-COMPT - LTRSD ID# | | | | | | | | 00015 | | | | | |
| | 585 | EAAA | PAQ PARENT - TRANSP : CANPAR - 2661 ID# | | | | | | | | 00010 | | | | | |
| | 675 | EAAA | PAQ PARENT - TRANSP : CANPAR - 2661 ID# | | | | | | | | 00010 | | | | | |
| V | 00001 | U-ISF | S/5 | | 0 230- | 2.30- | | | | | | | | | | 2.30- |
| | 00002 | U-IAR | /22 | | 0 230 | 11.30 | | | | | | | | | | 11.30 |
| | 00003 | U-IAR | /24 | | 0 230 | 14.00 | | | | | | | | | | 14.00 |
| | 00004 | C-EU | /2 | | 0 08.0‡ | 4.60 | | | | | | | | | | 4.60 |
| | 00005 | NIV 1 | S/4 | | 0 230 | 11.00 | | | | | | | | | | 11.00 |
| V | 00006 | CTVIS | S/5 | | 0 230- | 2.30- | | | | | | ‡ | | | | 2.30- |
| | 00007 | GENRL | S25/6 | | 0 230 | 4.45 | | | | | | | | | | 4.45 |
| | 00008 | NIV 4 | S/4 | | 1 230 | 11.20 | | | | | | | | | | 11.20 |
| | 00009 | U-LAI | /22 | | 0 230 | 8.50 | | | | | | | | | | 8.50 |
| | 00010 | 2661 | J/3 | | 0 230 | 1.84 | | | | | | | | | | 1.84 |
| V | 00011 | INTER | /7 | | 0 230- | 12.90- | | | | | | | | | | 12.90- |
| | 00012 | INTER | /7 | | 0 230 | 12.90 | | | | | | | | | | 12.90 |
| | 00013 | INTER | /7 | | 0 230 | 12.90 | | | | | | | | | | 12.90 |
| | 00014 | U-IAR | /22 | | 0 230 | 21.20 | 526.05 | 600.00 | ‡ | ‡ | | ‡ | 4.85 | 12345678901 | 98765432109 | 26.05 |
| | 00015 | LTRSD | / | | 0 230 | 1.52 | 350.00 | 500.00 | | | | ‡ | 10.46 | 12345678901 | 98765432109 | 11.98 |
| | 00016 | LTRSD | / | | 0 230 | 1.52 | | 1000.00 | | | | | 4.50 | 12345678901 | 98765432109 | 6.02 |
| | 00017 | NIV 1 | S/4 | | 0 230 | 11.00 | | 450.00 | | | | | | 12345678901 | 98765432109 | 11.00 |
| | 00018 | GENRL | S1J/6 | | 0 230 | 4.45 | 313.90 | 690.00 | ‡ | | | | 9.45 | 12345678901 | 98765432109 | 13.90 |
| | KL7IS | EAAA | PAQ PARENT - TRANSP : CANPAR - 2661 ID# | | | | | | | | 00010 | | | | | |
| | 354180 | EAAA | PAQ PARENT - TRANSP : CANPAR - 2661 ID# | | | | | | | | 00010 | | | | | |

220B

RECAPITULATION

| | COMPTE | CLASSE | KG/LBS.OZ‡ | FRAIS |
|---|---|---|---|---|
| POST CAN-COMPT | | | | |
| | 2 | LTRSD | 0 460 | 3.04 |
| CANPAR | | | | |
| | 2 | GENRL | 0 460 | 8.90 |
| | 1 | 2661 | 0 230 | 1.84 |
| | 1 | C-EU | 0 8.0‡ | 4.60 |
| UPS | | | | |
| | 4 | U-IAR | 0 920 | 57.80 |

190B

PAGE 2

DIR 2
123 ANY STREET
TORONTO ONTARIO
M2N1A1

DATE 25/05/89

ETAT DES TRANSACTIONS

| | COMPTE | CLASSE | KG/LBS.OZ‡ | FRAIS |
|---|---|---|---|---|
| | 1 | U-LAI | 0 230 | 8.50 |
| POSTE PRIOPIT | | | | |
| | 11 | NIV 1 | 2 530 | 121.00 |
| | 1 | NIV 4 | 1 230 | 11.20 |
| | 2 | INTER | 0 460 | 25.80 |

| | | POIDS | FRAIS | FRAIS CR | FRAIS VD | FRAIS ADL | SO | BON | FRAIS MANUT | FRAIS SPECIAUX |
|---|---|---|---|---|---|---|---|---|---|---|
| KG | 24 | 6 520 | 238.08 | | | | | | | |
| LBS.OZ‡ | 1 | 0 8.0‡ | 4.60 | | | | | | | |
| COMPTE TOT | 25 | | | 3 | 5 | 2 | 1 | 0 | 2 | 1 |
| FRAIS TOTAUX | | | 242.68 | 11.00 | 13.53 | .90 | | | 2.00 | 1.83 |

GRAND TOTAL $271.94

ELECTRONIC POSTAL SCALE WITH MULTILINGUAL OPERATOR PROMPTS AND REPORT HEADINGS

FIELD OF THE INVENTION

The invention relates to electronic postal/shipping scales that display operator prompt messages and/or are interfaced to a report printer.

BACKGROUND OF THE INVENTION

Electronic postal/shipping scales (hereinafter "postal scales") are known. Prior art postal scales are described in U.S. Pat. No. 4,718,506 to Hills and copending patent application Ser. No. 139,881, both of which are assigned to the assignee of this application and the disclosures of which are incorporated herein by reference.

Many postal scales have an alphanumeric display for presenting weight and postal rate information and operator prompt messages. One such display is disclosed in U.S. Pat. No. 4,135,662 to Dlugos, the disclosure of which is incorporated herein by reference. The prompt messages serve to alert the user that input is required or that an error has occurred.

It is also common for such scales to include a microprocessor and an interface for driving a report printer. Reports generated by the scale usually are in the form of a report heading followed by columns of information, each column beginning with a column heading. A typical report might list all shipping transactions processed by the scale during a period of time. The scale and printer may also be used as a manifest system, like that described in U.S. Pat. No. 4,763,271, the disclosure of which is incorporated herein by reference. A manifest is a list of parcels consigned to a carrier for delivery, and includes for each parcel an identification number and the shipping charge. The total charge for the entire group of parcels is also stated.

Prior art postal scales display operator prompt messages and print reports in one language only. In the United States, of course, that language is English. However, in some parts of this country a large part of the population is more versed in another language, e.g. Spanish. Further, in some foreign countries there is more than one official language. In Canada, for example, both French and English are official languages, and use of either or both languages is frequently encouraged or required. Thus, some parcel carriers may require that manifests be printed in English while others require French language manifests. It is also to be noted that a single postal scale often is used by several different people, not all of whom may wish to receive prompt messages or to print reports in the same language.

It is accordingly an object of this invention to provide a postal scale which is suitable for use by poly-lingual groups of users.

SUMMARY OF THE INVENTION

The above object is achieved, and the disadvantages of the prior art are overcome, in accordance with the subject invention by means of a postal scale that comprises weight sensing means for generating a weight signal, means for generating a language select signal, and display means for displaying operator prompt messages. The scale also comprises a memory that stores at least two sets of operator prompt message texts, each set being in a different language. The scale further comprises a microprocessor that receives the weight and language select signals, selects one set of operator prompt message texts in accordance with the language select signal, and causes prompt messages from the selected set to be displayed on the display.

In another embodiment, the scale system comprises a printer in addition to or instead of a display, and the memory stores at least two sets of report heading texts, each set in a different language, in addition to or instead of the sets of operator prompt message texts.

In a preferred embodiment, the operator prompt message and report heading texts are stored in the form of character strings, each string consisting of two substrings. The first substring of each string contains a prompt message or heading in a first language. The second substring contains, in a second language, a prompt message or heading corresponding to that contained in the first substring.

Other objects, features and advantages of the invention will become apparent in light of the following description thereof.

BRIEF DESCRIPTION OF THE DRAWINGS

FIGS. 8A and 8B are examples of reports generated by the scale.

DETAILED DESCRIPTION OF THE INVENTION

1. Hardware Arrangement

Figure 1:
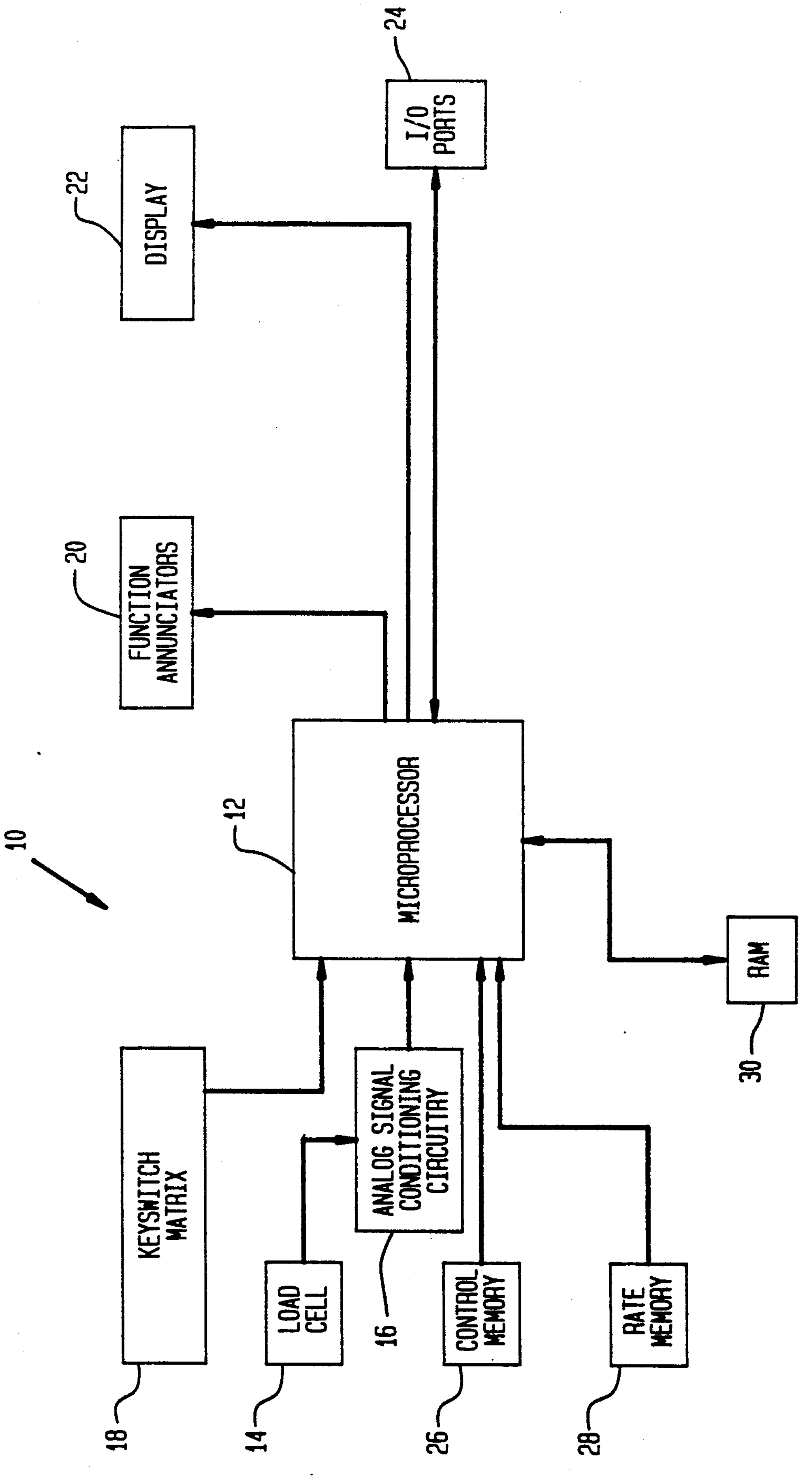
FIG. 1 is a block diagram of the electronic components of a postal scale according to the invention.

Referring to FIG. 1, the hardware arrangement of postal scale 10 is well known and includes microprocessor 12. In a preferred embodiment of the invention, microprocessor 12 is a model 80C88 available from Intel Corporation, Santa Clara, Calif.

When an item to be mailed (not shown) is placed on the tray (not shown) of scale 10, conventional load cell 14 provides a signal indicative of the weight of the item. In a preferred embodiment of the invention, load cell 14 is a Mark III load cell available from Weigh-Tronix, Inc., Santa Rosa, Calif.

In a manner well known to those skilled in the art, analog signal conditioning circuitry 16 receives the signal from load cell 14, conditions the signal and converts it into digital information which it provides to microprocessor 12. Microprocessor 12 converts the information into data representing the weight of the item.

Microprocessor 12 receives signals from keyswitch matrix 18, which preferably comprises a 6×7 matrix. Through keyswitch matrix 18 the user is able to select the desired class of service and to input alphanumeric information such as destination zone or postal code.

Microprocessor 12 drives function annunciators 20 and display 22. Function annunciators 20 are preferably light emitting diodes (LEDS), and indicate to the user what function(s) scale 10 is performing. Display 22 displays to the user alphanumeric information such as the weight or postal rate applicable to the item to be mailed as well as user instruction prompts and error messages. Display 22 preferably comprises a vacuum fluorescent display of 8 seven-segment numeric and 16 fourteen-segment alphanumeric characters.

Microprocessor 12 is interconnected with input/output ports 24, through which microprocessor 12 is able to control and/or exchange data with external devices (not shown) such as postage meters, parcel registers, printers, scanners or computers. Input/output ports 24 preferably comprise up to 8 ports of which some are adapted to RS232 communications, some are adapted to echoplex communications and some are configurable either for RS232 or echoplex.

Control memory 26 is accessible by microprocessor 12 and contains the software for controlling the operation of scale 10. Rate memory 28 is accessible by microprocessor 12 and contains a directory, postal code to zone conversion information, rate tables and carrier-specific information such as manifest format. Control memory 26 and rate memory 28 preferably comprise electrically programmable read only memory chips. Rate memory 28 is preferably an EPROM carried on a detachable circuit board.

Random access memory (RAM) 30 is accessible by microprocessor 12 for read or write operations. RAM 30 is preferably battery backed up and is used, for example, for storing shipping transaction information from which manifests or activity reports may be generated.

In certain embodiments, scale 10 may also include input devices such as a bar code reader, an optical character reader or a touchscreen. These devices may be used to input item weight data or other information.

2. Software Architecture

Figure 2:
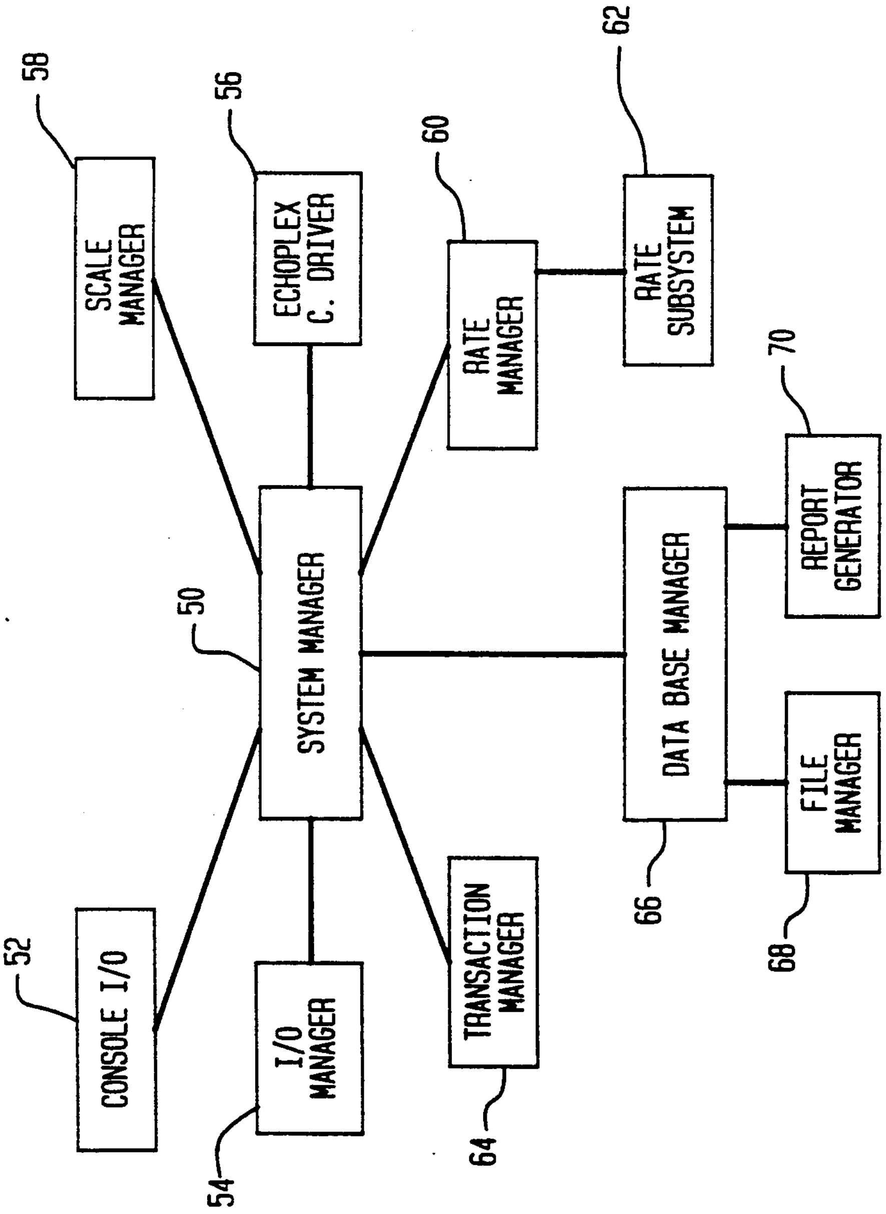
FIG. 2 is a representation of the software architecture of the scale of FIG. 1.

The software architecture of scale 10 is well known and may be described by reference to FIG. 2.

System manager 50 handles console input commands, weight display and interpretation and system level initialization. System manager 50 also updates global data structures and concurrently, via time slices, handles several of the software subsystems.

Console input/output module 52 interacts with system manager 50 and handles user interface through keyswitch matrix 18 and display 22. Module 52 may also be directed to handle input/output through an external terminal (not shown) and/or input from a barcode reader (not shown).

Input/output manager module 54 interacts with system manager 50 and manages input and output through input/output ports 2 with external devices (not shown) such as one or more line printers, a label printer, one or more barcode scanners, and a host computer.

Echoplex C-driver module 56 interacts with system manager 50 and manages echoplex communication through input/output ports 24 with external devices (not shown) such as a postage meter, a parcel register, a document printer and a mailroom management computer. Echoplex communication is described in U.S. Pat. Nos. 4,535,421 and 4,301,507.

Scale manager module 58 interacts with system manager 50 and maintains correct weight and scale status for the system. In addition to load cell 14 of scale lo, module 58 is able to manage a remote scale platform (not shown) and to receive manual weight input through keyswitch matrix 18.

Rate manager module 60 builds up the rate structure for the current transaction and provides an interface between system manager 50 and rate subsystem module 62. Rate subsystem module 62 accesses rate memory 28 in order to obtain the appropriate rate information from the appropriate rate table in rate memory 28.

Transaction manager module 64 interacts with system manager 50 and builds up for each transaction the transaction file to be recorded into the data base. Data base manager module 66 also interacts with system manager 50 and comprises file manager module 68 and report generator module 70. File manager module 68 handles file maintenance functions including appending, pack/unpack and search/void of individual transactions and indexing and sorting subsections of the data base. Report generator module 70 generates formatted reports for output through input/output manager module 54 to a line printer, document printer or label printer.

3. Language Selection

The language selection features of scale 10 will now be described. In a preferred embodiment of the invention there are three different language selection processes, of which the first determines the language in which messages are displayed on display 22, the second determines the language in which carrier manifests are printed, and the third determines the language in which other reports are printed.

A. Display Messages

Display message texts are stored in control memory 26. Preferably these texts are stored in the form of character strings, the end of each string being denoted by a string termination character. Preferably the string termination character is a null character. In a preferred embodiment, each character string comprises two substrings. The first substring of each string contains a message text in a first language. Each of the first substrings contains a different message text and terminates with a null character. The second substring of each character string contains a message text in a second language and terminates in a null character, which also serves as the termination character for the character string. In each character string, the message text contained in the second substring is a translation into the second language of the message text contained, in the first language, in the first substring.

Figure 3:
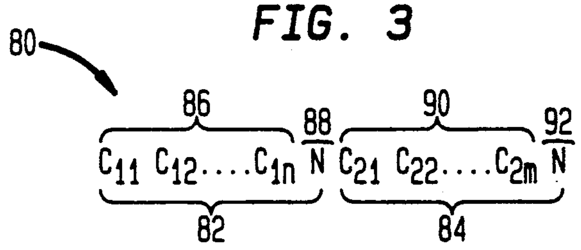
FIG. 3 is a representation of a character string stored in the memory of the scale.

FIG. 3 is a diagrammatic representation of a character string as described in the previous paragraph. Reference character 80 denotes the entire string. String 80 consists of first substring 82 and second substring 84. First substring 82 comprises digitally encoded characters $C_{11} \ldots C_{1n}$ first language message text 86. First substring 82 further comprises null character 88 which follows first language message text 86.

Similarly, second substring 84 comprises second language message text 90, consisting of digitally encoded characters $C_{21} \ldots C_{2m}$ followed by null character 92. Second language message text 90 is a translation of first language message text 86.

In a preferred embodiment of the invention, the first language is considered "primary" and is the language automatically selected, as described below, when scale 10 is first powered up. In such preferred embodiment the second language is considered "secondary". In a preferred embodiment the primary language is English and the secondary language is French.

For example in one character string 80 in the preferred embodiment text 86 consists of the digitally coded characters representing the message "ENTER CLASS" and text 90 consists of the digitally coded characters representing the message "INTRO CLASSE". Thus, at an appropriate point in operation of scale 10, and assuming English has been selected as the display language, display 22 shows "ENTER CLASS" thereby prompting the operator to select a class of parcel transportation. If at the same point French had been selected, display 22 would have shown "INTRO CLASSE".

A display language flag, which is preferably a specific memory location, is used in selecting either the primary or secondary language for display of message texts. Storage in that location of a first character indicates selection of the primary language, while storage of a second character indicates selection of the secondary language.

Figure 4:
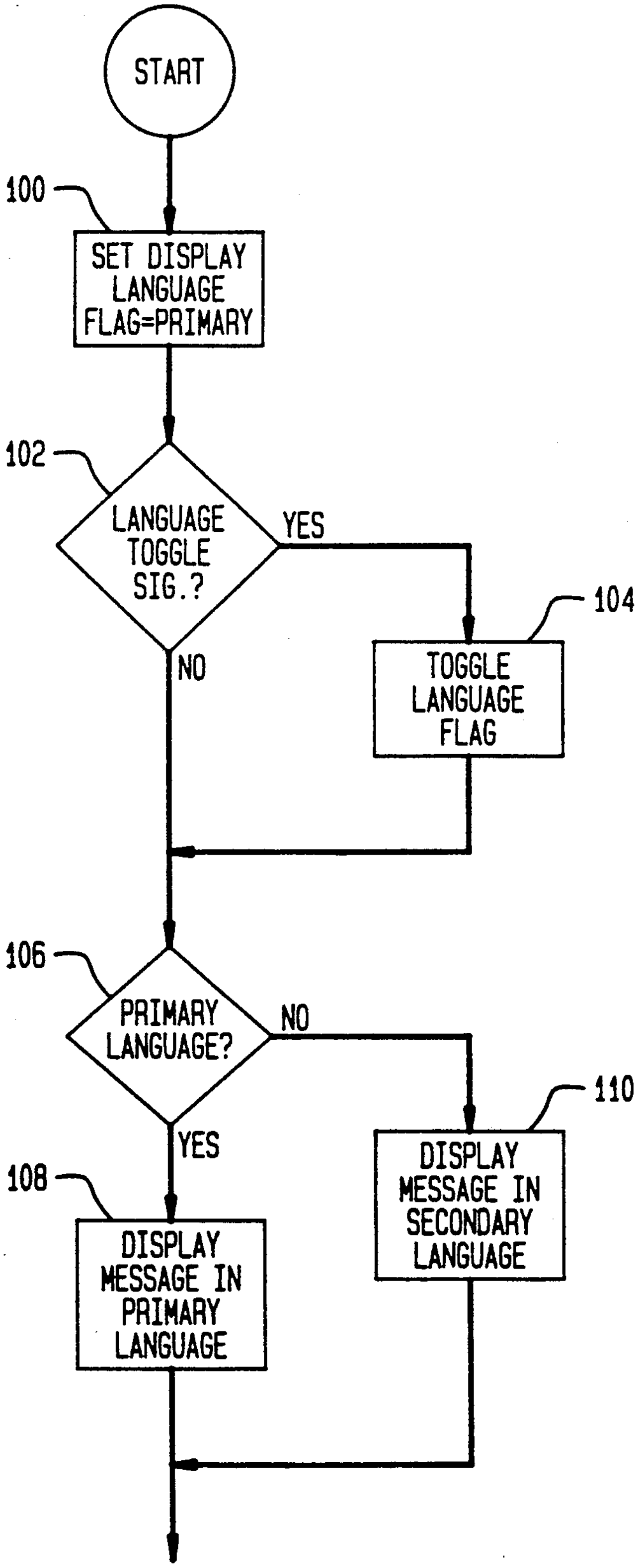
FIGS. 4 and 5 are flow charts of the display language selection function of the scale.
Figure 5:
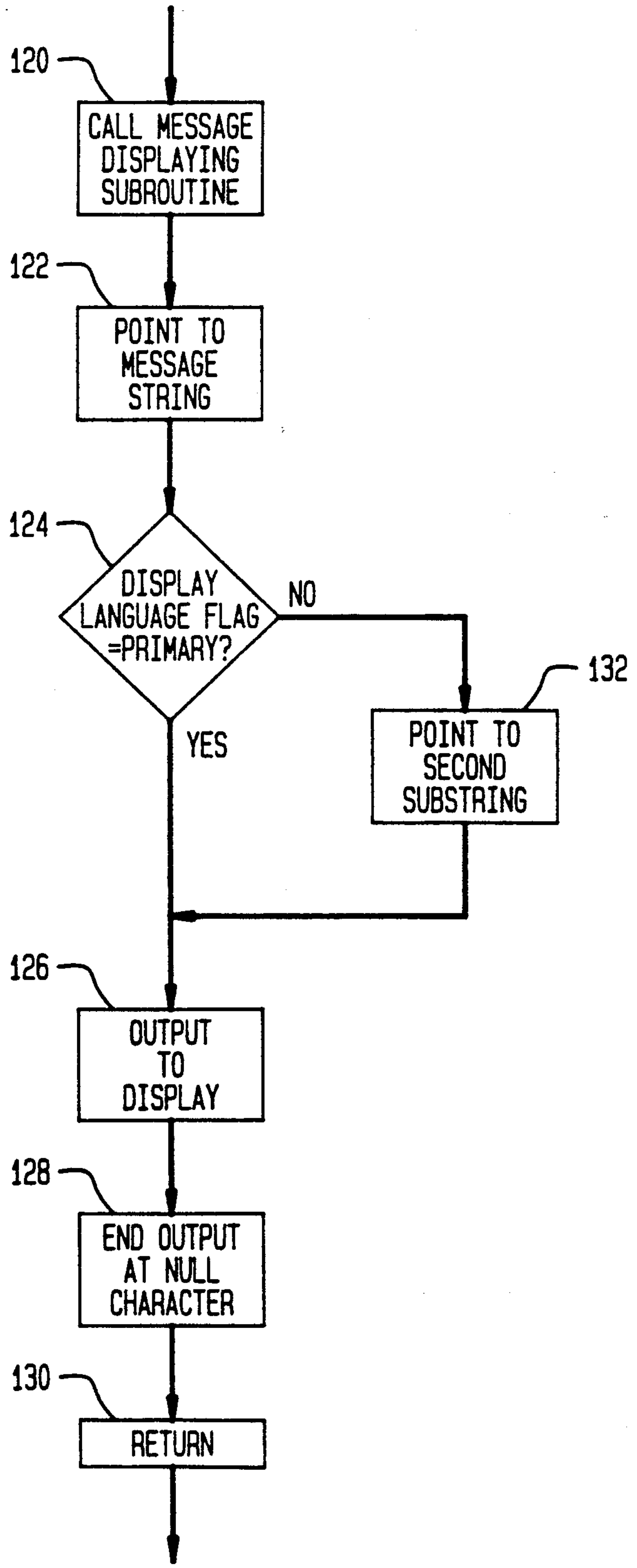

FIGS. 4 and 5 illustrate language selection for display message texts. The process begins with power up of scale 10, at which time system manager module 50 sets the display language flag to "primary", by storing in the aforesaid memory location the character corresponding to the primary language (step 100). The state of the display language flag thereafter remains unchanged until such time as the operator of the scale, through keyswitch matrix 18, actuates a change in the display language. At any time when no data entry is required, scale 10 will be responsive to a language change signal (or "language toggle") entered through keyswitch matrix 18. If, at step 102, such a signal is entered, the state of the display language flag is changed (step 104).

At step 106, which occurs whenever a message is to be displayed the state of the display language flag is tested. If the state is "primary", the message is displayed in the primary language (step 108). Otherwise, the message is displayed in the secondary language (step 110).

FIG. 5 illustrates in more detail how system manager module 50 operates to display a message either in the primary language (step 104) or the secondary language (step 106), depending on the state of the display language flag.

When the subroutine for displaying messages is called (step 120), there is passed to that subroutine a pointer which points to the memory location of the first character $C_{11}$ of the character string 80 which contains the message to be displayed (step 122). The subroutine then tests the state of the display language flag (step 124). If the state of the flag corresponds to the primary language, a subroutine is called which, through console I/O module 52, outputs characters $C_{11}$ through $C_{1n}$ to display 22 (step 126) resulting in display of a message corresponding to first language message text 86. The output subroutine stops at null character 88 (step !28), and the message display subroutine ends with a return to the main program (step 130).

If at step 124 the state of the display language flag does not correspond to the primary language, the subroutine tests each character $C_{11}$ through $C_{1n}$ to see if it is a null character. When null character 88 is detected, the pointer is set to point to the next memory location, which is that of character $C_{21}$, the first character of second substring 84.

Step 126 then follows, but in this case characters $C_{21}$ through $C_{2m}$ are output to display 22, resulting in display of a message corresponding to second language message text 90. The output subroutine stops at null character 92 (step 128) and there is a return to the main program (step 130).

Although the embodiment of scale 10 described above allows for toggling between only two languages, it should be understood that language toggling among three or more languages is possible. In general, language toggling among N languages may be realized by including in each character string 80 N substrings, each terminating in a termination character, where the first substring contains the desired message in the primary language, the second substring contains that message in the secondary language, and so forth, with the Nth substring containing the message in the Nth language. The display language flag must have N possible states, the state of the flag being determined either by menu selection or by "toggling" sequentially from the primary through to the Nth state. Finally, the message display subroutine, after testing the state of the flag, and assuming that the state of the flag corresponds to the jth language, must advance the output pointer to the memory location after the location in which the (j−1)th null character is detected, resulting in output of the jth substring. If the state of the flag corresponded to the primary language, the pointer is not advanced, and the first substring is output.

It should also be understood that, in the two language embodiment described above, the primary language message text may be in second substring 84, in which case the secondary language message text is in first substring 82, and the setting of the display language flag to primary causes the pointer to be advanced past the first null character 88, while the pointer is not advanced when the flag is set to secondary.

It should also be noted that in a preferred embodiment of scale 10, there are service display messages used in scale service functions to be performed by service technicians and not by scale users. These messages are stored only in English.

B. Manifest headings

Selection of the language to be used in printing a manifest is for the most part similar to display message language selection. The heading texts are stored in character strings 80, comprising substrings 82 and 84, as described previously and shown in FIG. 3. The chief difference is that a second flag, the printer language flag, is used in addition to the display language flag.

Each parcel carrier requires that manifests submitted to it be in a certain format and contain certain information. Data regarding required manifest format and content is stored in the rate memory 28. Additional data relating to report templates and column headings is stored in report generator module 70. When the user of scale 10 requests, through keyswitch matrix 18, that a manifest be printed for a given carrier and class of service, rate manager module 60 retrieves via rate subsystem module 60 the format and content data for the carrier and class. Rate manager module 60 passes that data to system manager module 50. The data includes a printer language character which serves as the printer language flag. The flag may be set to one of three characters, of which the first corresponds to the primary language, the second to the secondary language, and the third to the "display" language, which is the currently selected language for displaying messages.

Figure 6:
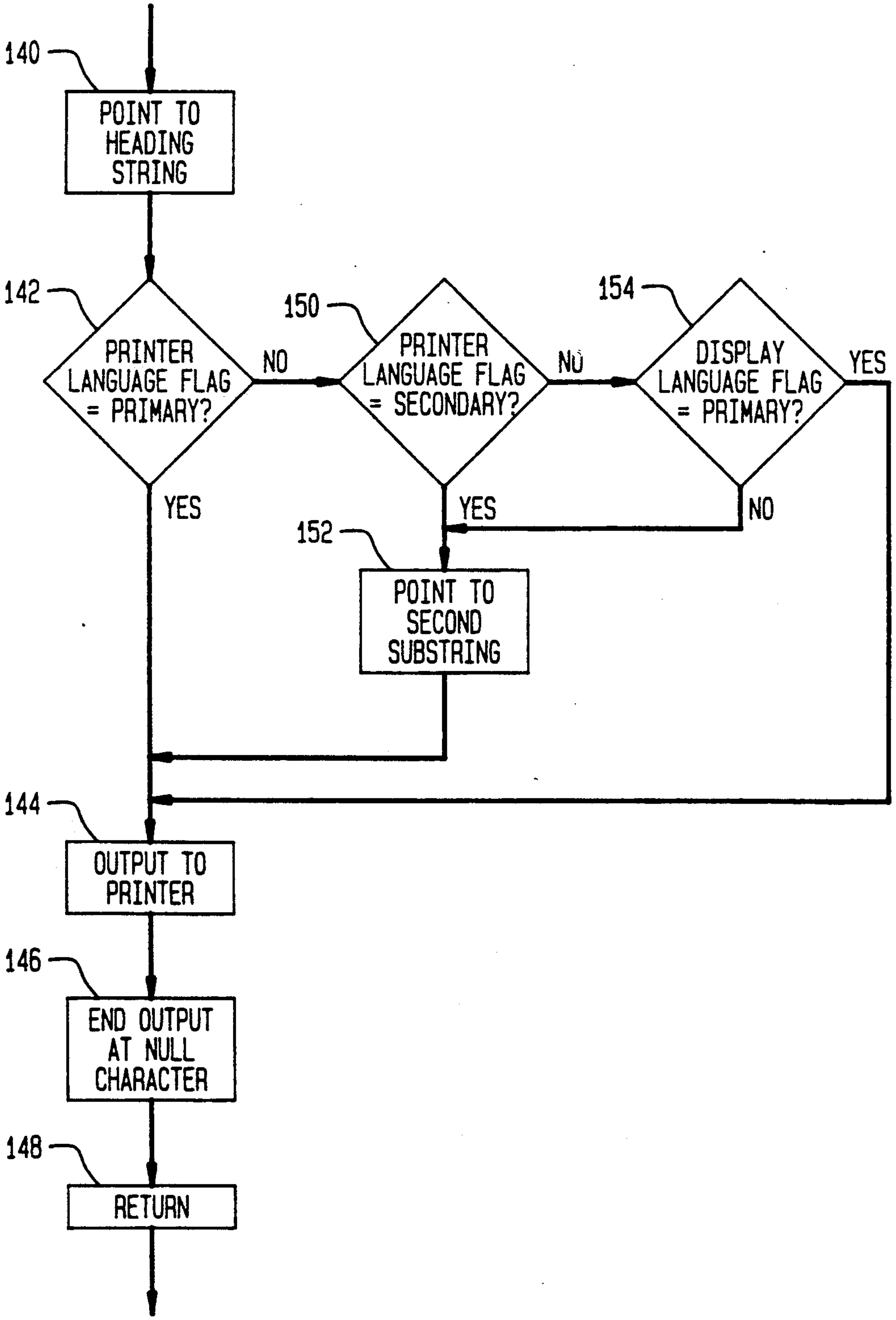
FIG. 6 is a flow chart of the manifest language selection function of the scale.

FIG. 6 illustrates how the printer language flag causes the manifest to be printed in the required language. The report generator module 70 assembles the report from data and from text strings. The text strings comprise such items as report headings, column headings and column items, all of which will be referred to as "headings." The headings texts are stored in strings in the form of string 80 of FIG. 3. For each place in the report at which a heading is to be inserted, there is a pointer to the memory location of character $C_{11}$, which is the first character of first substring 82 (FIG. 6, step 140). If the printer language flag corresponds to the primary language (step 142), the pointer is not advanced, heading text 86 is output for printing (step 144), the outputting of the string 80 ends at null character 88 (step 146), and the subroutine returns (step 148).

If at step 142 the printer language flag is found not to correspond to the primary language, it is next determined whether the printer language flag corresponds to the secondary language (step 150). If so, the pointer is advanced to the memory location immediately following that of null character 88, as a result of which the pointer points to the location of $C_{21}$, the first character of second substring 84 (step 152). Steps 144, 146 and 148 follow, resulting in the output of heading text 90.

If at step 150, the printer language flag is found not to correspond to the secondary language, the state of the display language flag is determined (step 154). If the display language flag corresponds to the primary language, the pointer is not advanced, and steps 144, 146 and 148 follow, resulting in output of heading text 86. If at step 154, the display language flag does not correspond to the primary language, step 152 follows, resulting in advancement of the pointer so as to point to heading text 90, which is output as a result of steps 144, 146 and 148.

It will be noted that if the printer character passed from the directory does not correspond to either the primary or the second language, this signifies that the carrier does not require the manifest to be printed in a specific one of the two languages. Accordingly, the user is free to select the language for the manifest by selection of a display language as previously described.

C. Report Headings

Selection of the language for reports (other than manifests) closely resembles display message language selection, except that the state of the report language flag is changed in response to a menu displayed on display 22 rather than by a toggling signal.

Figure 7:
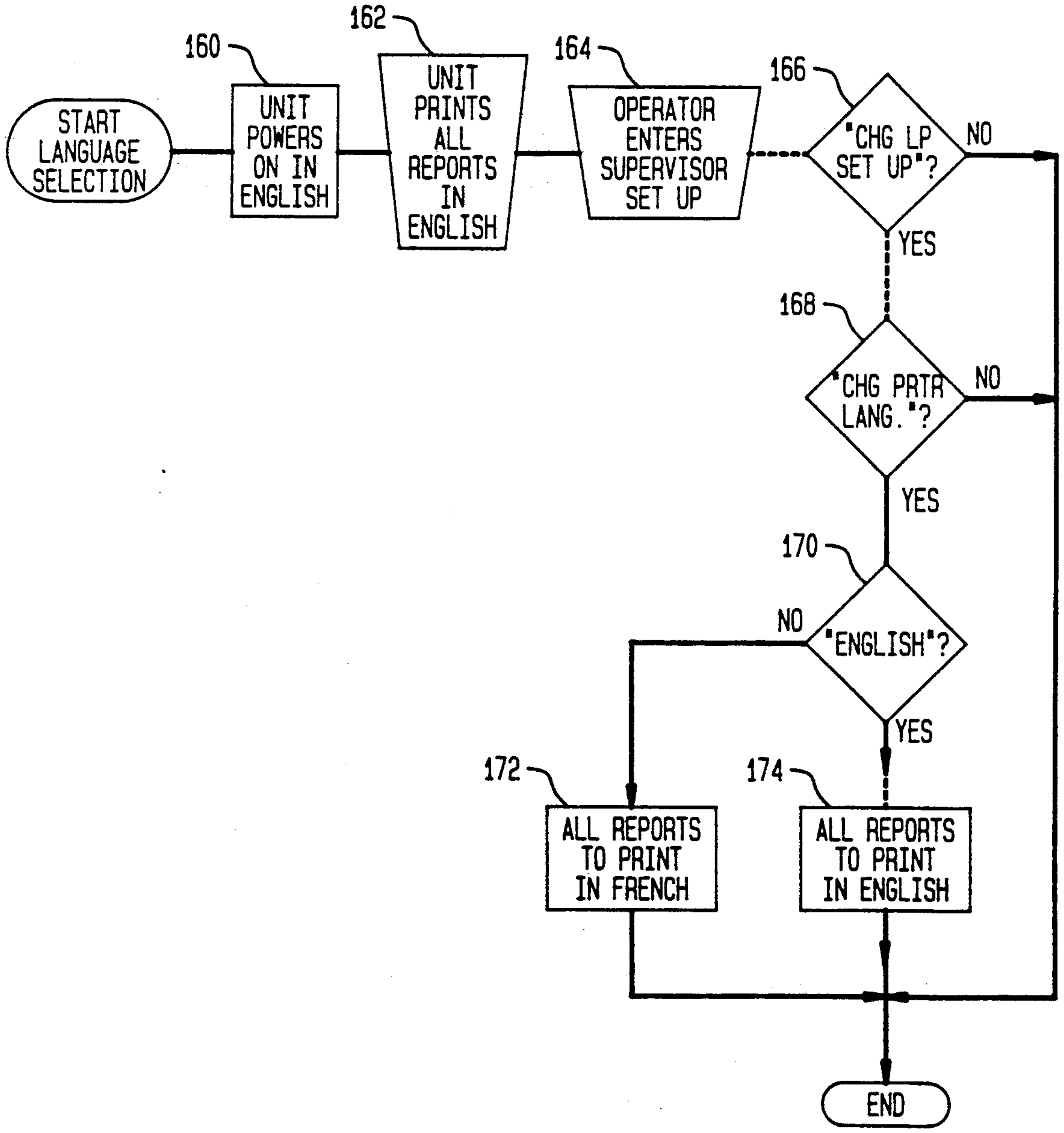
FIG. 7 is a flow chart of the report language selection function of the scale.

FIG. 7 illustrates setting of the report language flag. It is assumed that, as in the preferred embodiment, the primary language is English and the secondary is French.

When scale 10 powers up, the report language flag is set to correspond to the primary language (step 160) and all requested reports (other than manifests) are printed in English (step 162).

If it is desired to change the language in which reports are printed, one must enter the supervisor set up mode of operation (step 164) by entry of appropriate signals via keyswitch matrix 18. As entry into the supervisor set up mode is controlled by a password or other conventional means, selection of the report language is restricted to those persons, typically managers, who are authorized to enter the supervisor set up mode. This enables management exclusively to determine in which language reports will be prepared.

After entry into the supervisor set up mode, a series of menu prompt messages are displayed on display 22. The first such message is "CHG LP SET UP" (step 166), which signifies: "Change line printer set up?+ If the operator enters a negative response, via keyswitch matrix 18, the set up mode continues without a change in the report language flag. If the operator enters an affirmative response, display 22 shows "CHG PRTR LANG" (step 168), which signifies: "Change printer language?" Again if a negative response is entered, the report language flag is unchanged, but if an affirmative response is entered, display 22 shows "ENGLISH" (step 170). A negative response at this point causes the state of the report language flag to be changed so as to correspond to the secondary language. Thereafter, all reports (other than manifest) are printed in French (step 172). However, if at step 170 an affirmative response is entered, all reports continue to be printed in English (step 174).

Assuming reports are currently being printed in French and the operator desires to change to English, he operates scale 10 so as to proceed through steps 164, 166, 168 to 170. At step 170, an affirmative response is entered, changing the state of the report language flag from secondary to primary. Thereafter, all reports are printed in English (step 174).

The foregoing discussion of FIG. 7 assumes that English had been selected as the display language. If French had been the display language, the report language selection process would have been the same, except that the prompt messages displayed at steps 166, 168, 170 would have been French translations of those shown in FIG. 7.

Report heading texts, like the manifest heading texts and display message texts discussed above, are stored in the form of character strings 80 as shown in FIG. 3. The way in which either first text 86 or second text 90 is selected for output is virtually identical to that described above by reference to FIG. 5. Accordingly, selection between texts 86 and 90 will not be discussed in detail, except to point out the differences as compared to FIG. 5. These differences are: (1) the form of output is printing rather than display; (2) the report language flag is tested rather than the display language flag; and (3) the contents of texts 86 and 90 are report headings, column headings and column items rather than display messages.

FIGS. 8A and 8B each show an example of a report generated by scale 10. Report 190B shown on FIG. 8B is the French version of report 190A shown in English on FIG. 8A. Reference captions 200A, 200B denote the respective report title headings of reports 190A, 190B. Reference captions 210A, 210B respectively denote some of the column headings of reports 190A, 190B. Reference captions 220A, 220B respectively denote some of the column items of reports 190A, 190B. It will be appreciated that digitally encoded characters representing title heading 200A make up a text 86 and digitally encoded characters representing title heading 200B make up a text 90 of the same string 80. By the processes previously described, selection of English as the report language caused text 86 to be output in connection with the generation of report 190B, while selection of French as the report language caused text 90 to be output in connection with the generation of report 190B. Such was also the case for all the other headings, column items and so forth that are included in reports 190A, 190B.

As was the case for display message texts, three or more language options may be supported for manifests and/or other reports. As before, N language options are provided by including N different language substrings in each character string 80, providing for N states of the appropriate flag and selecting a particular one of the N languages by setting the flag equal to the state corresponding to the desired language.

The above-detailed description is provided by way of illustration only an other embodiments of the subject invention will be readily apparent to those skilled in the art. For example, it is noted that four different methods of setting language flags were used: (1) default value on power up; (2) toggling signal; (3) stored character; and (4) response to menu prompt. Methods (1) and (2) were used for display message language selection, methods (2) and (3) for manifest language selection, and methods (1) and (4) for report language selection. It is within the scope of this invention that any one of methods (2), (3) and (4), or any combination thereof, with or without method (1), be used for any of display message, manifest or report language selection. It is further within the scope of this invention that more than one language be selectable only for any one or any two of: display messages, manifests, reports.

What is claimed is:

1. A postal scale comprising:
(a) weight sensing means for generating a weight signal;
(b) input means for generating a language select signal;
(c) output means for outputting texts;
(d) a memory for storing texts, said texts comprising a plurality of sets of texts, each of said sets being in a different language; and
(e) a microprocessor programmed to:
(i) receive and process said weight signal;
(ii) receive said language select signal;
(iii) select one of said sets of texts in accordance with said language select signal; and
(iv) cause said output means to output texts from said selected set.

2. A postal scale as claimed in claim 1, wherein said texts are stored in said memory in the form of character strings, each of said character strings comprising at least two substrings, each of said substrings ending in a termination character.

3. A postal scale as claimed in claim 2, wherein for each of said strings, the first substring of said string contains a text in a first language, and the Nth substring of said string contains a text that is a translation into an Nth language of the text contained in the first substring of said string, N being an integer equal to or greater than two.

4. A postal scale as claimed in claim 3, wherein said first language is English and the second language is French.

5. A postal scale as claimed in claim 3, wherein said first language is French and the second language is English.

6. A postal scale as claimed in claim 3, wherein said output means comprises a display.

7. A postal scale as claimed in claim 3, wherein said output means comprises a printer.

8. A postal scale as claimed in claim 3, wherein said input means comprises a keyboard.

9. A postal scale as claimed in claim 1, wherein said input means comprises a keyboard.

10. A postal scale as claimed in claim 1, wherein said input means comprises a detachable memory element that stores a language selection character.

11. A postal scale comprising:
(a) weight sensing means for generating a weight signal;
(b) means for generating a display language select signal;
(c) display means for displaying texts;
(d) a memory for storing texts, said texts comprising a plurality of sets of texts, each of said sets being in a different language; and
(e) a microprocessor programmed to:
(i) receive and process said weight signal;
(ii) receive said display language select signal;
(iii) select one of said sets of texts in accordance with said language select signal; and
(iv) cause said display means to display texts from said selected set.

12. A postal scale as claimed in claim 11, wherein a first one of said sets is in a first language and a second one of said sets is in a second language, and further comprising:
(f) a printer for printing manifests; and
(g) means for generating a manifest language select signal; and wherein said microprocessor is programmed to:
(v) receive said manifest language select signal; and
(vi) in accordance with said manifest language select signal, cause said printer to print a manifest in said first language or in said second language or in a language determined in accordance with said display language select signal.

13. A postal scale as claimed in claim 12, wherein said display language select signal generating means comprises a keyboard and said manifest language select signal generating means comprises a detachable memory element that stores a language selection character.

14. A postal scale as claimed in claim 11, wherein a first one of said sets is in a first language and a second one of said sets is in a second language, and further comprising:
(h) a printer for printing reports; and
(i) means for generating a report language select signal; and wherein said microprocessor is programmed to:
(vii) receive said report language select signal; and
(viii) cause said printer to print a report in said first language or in said second language in accordance with said report language select signal; said report language select signal generating means being operable only when said scale is in a supervisor set up mode.

15. A postal scale as claimed in claim 14, wherein said display language selection signal generating means comprises a keyboard.

16. A postal scale as claimed in claim 14, wherein said report language selection signal generating means comprises a keyboard.

* * * * *